O. W. HINER, D. C. FARNHAM AND E. A. FARNHAM, Jr.
ANIMAL FEEDER.
APPLICATION FILED AUG. 26, 1919.
1,346,024.
Patented July 6, 1920.
2 SHEETS—SHEET 2.
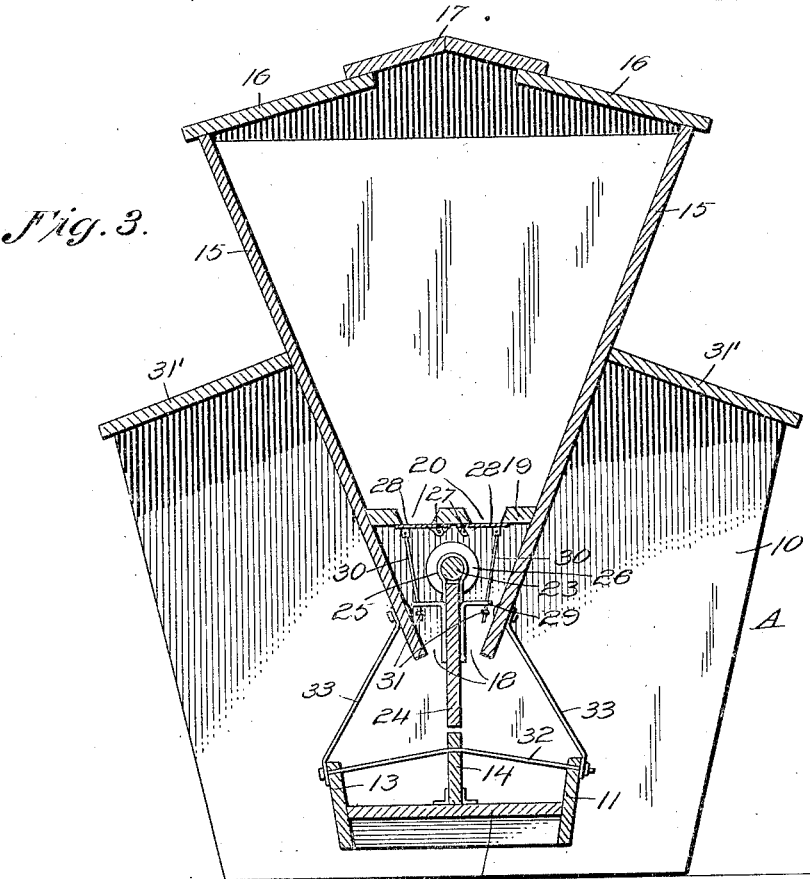
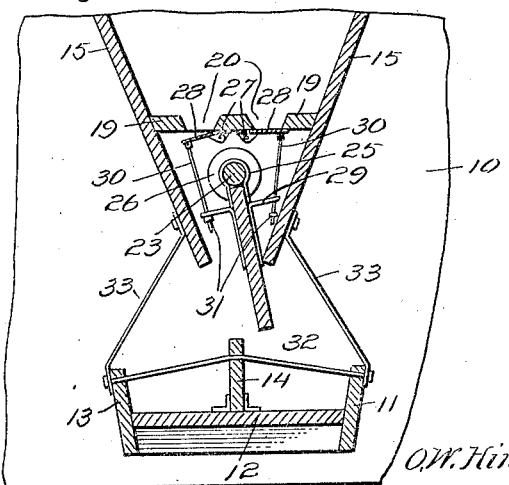
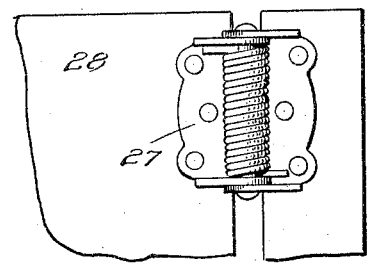
Inventor
O. W. Hiner, D. C. Farnham & E. A. Farnham Jr.
By Geo. F. Kimmel
Attorney

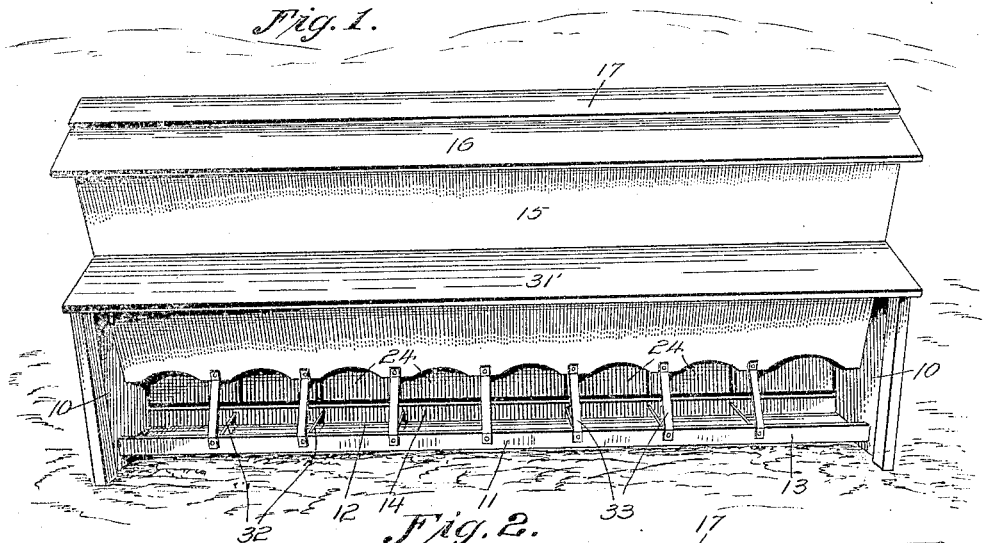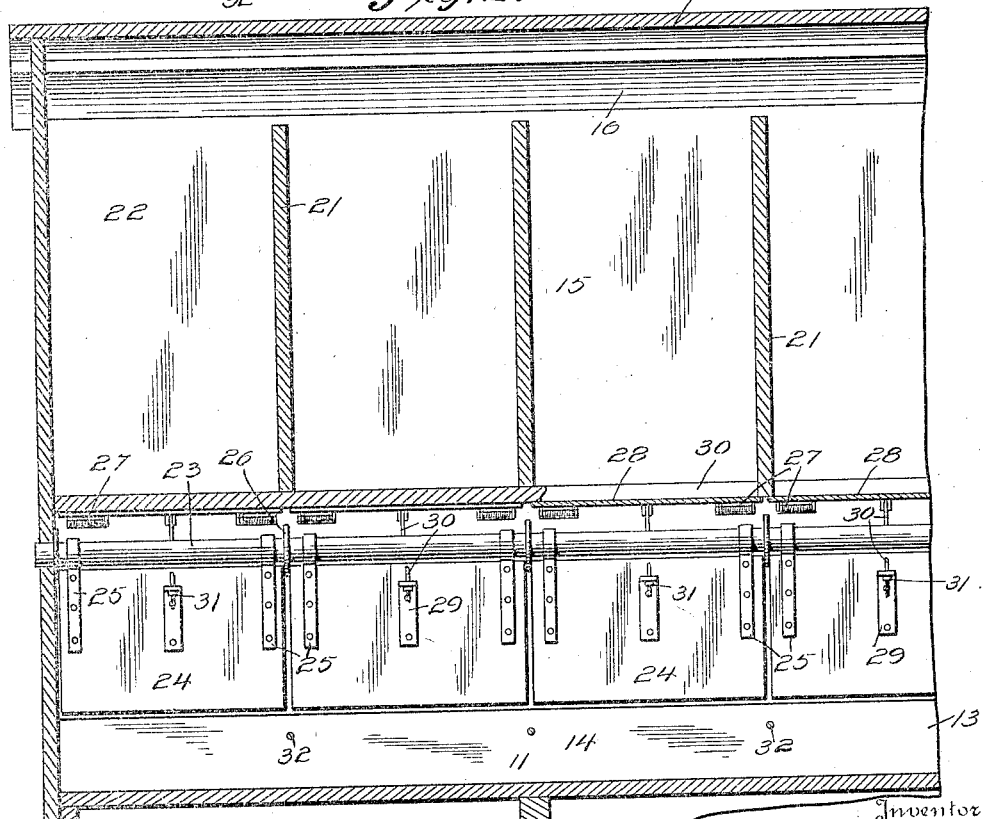

UNITED STATES PATENT OFFICE.

ORA W. HINER, DANA C. FARNHAM, AND ELI A. FARNHAM, JR., OF BUTLER, INDIANA.

ANIMAL-FEEDER.

1,346,024.  Specification of Letters Patent.  Patented July 6, 1920.

Application filed August 26, 1919. Serial No. 319,872.

*To all whom it may concern:*

Be it known that we, ORA W. HINER, DANA C. FARNHAM, and ELI A. FARNHAM, Jr., citizens of the United States, residing at Butler, in the county of Dekalb and State of Indiana, have invented certain new and useful Improvements in Animal-Feeders, of which the following is a specification.

The invention relates to an animal feeder, and more particularly to the class of self feeding troughs for hogs, cattle or the like.

The primary object of the invention is the provision of a feeder of this character, wherein a plurality of compartments are arranged within a bin superposed above the trough and the contents of each compartment can be fed therefrom independently of any of the other compartments, thereby avoiding any waste in the feed, the feed controlling mechanism for each compartment, being controlled by the animal and only a small quantity of feed is admitted to the trough, so that there is no possibility of the overfeeding of the animal and resultant waste in the food.

Another object of the invention is the provision of a feeder of this character, wherein the construction thereof enables the same to be placed within the open, without any liability of the soaking of the feed with water during inclement weather, and the possibility of molding of the feed is eliminated, the controlling mechanism for the compartments of the bin being of novel form to be actuated by an animal, so that each animal will receive a portion of food without liability of waste and this controlling mechanism is not susceptible of being actuated by wind which would necessarily result in the discharge of feed from the bin into the trough.

A further object of the invention is the provision of a feeder of this character wherein animals can be fed from either side of the same the food material being only let into the trough at that side on which the animal is located, so that there is no possibility of any waste of the food material from the compartments of the bin in the use of the feeder.

A still further object of the invention is the provision of a feeder of this character wherein the food material is completely housed, so that there is no chance of the feed getting wet and freezing up in cold weather, as the same is thoroughly protected from climatic changes, the feeder being readily accessible to the animals for the proper feeding thereof in the use of the feeder.

A still further object of the invention is the provision of a feeder of this character, which is comparatively simple in construction, very reliable and efficient in its purpose, strong, durable, and inexpensive to manufacture and install.

With these and other objects in view, the invention consists in the features of construction, combination and arrangement of parts as will be hereinafter fully described, illustrated in the accompanying drawings, and pointed out in the claims hereunto appended.

In the accompanying drawings:

Figure 1 is a perspective view of a feeder constructed in accordance with the invention.

Fig. 2 is a fragmentary vertical longitudinal sectional view through the feeder.

Fig. 3 is a vertical transverse sectional view.

Fig. 4 is a fragmentary vertical transverse sectional view, similar to Fig. 3 showing the nose or head board of the feed controlling mechanism in shifted position to permit the feed of material into the trough from one side thereof.

Fig. 5 is a fragmentary plan view showing in detail one of the hinges of the feed controlling mechanism.

Similar reference characters indicate corresponding parts throughout the several views in the drawings.

Referring to the drawings in detail, the feeder comprises a body or frame A, including spaced vertical ends 10, preferably of the shape shown in Fig. 3 of the drawings and between these ends is located the feeding trough 11 which has its bottom 12 suitably secured at opposite ends to the ends 10 of the body, the side walls 13 of said trough being disposed in upwardly divergent relation to each other, while centrally of the trough 11 and disposed longitudinally thereof throughout its length is a vertical partition or dividing slat 14, which serves to divide the trough, so that animals, such as hogs, pigs or the like can be fed therefrom at either side of the partition or slat 14. The trough 11 is positioned in the body or frame A slightly elevated from the ground or foundation to be readily accessible to the animals to be fed therefrom.

Superposed relative to the trough 11 and arranged in the body A is a substantially hopper shaped feed bin 15 having the crowned double sloping roof 16, and crown 17 the sections of the roof 16 being removably fitted thereon so that access may be had to the interior of the bin 15 for the filling thereof with feed. The bin 15 at its lower narrower end or bottom portion is open at 18 to serve as a discharge mouth throughout the longitudinal extent of the bin for the delivery of the contents into the trough 11.

Interiorly of the bin 15 spaced above the opening 18 at the bottom portion thereof is a false bottom 19 which is coextensive with the length of the bin and has formed therein at opposite sides of the central portion of said bottom 19 discharge slots or openings 20 while above the bottom 19 interiorly of the bin transversely thereof at intervals are vertical partitions or dividing walls 21 which separate the bin into a plurality of compartments 22 for receiving food material, such as corn (cracked shells), oats, barley or any other small grains of feeding material or a mixture thereof. The slots or openings 20 in the bottom 10 permit the gravitation of the feed within the compartments 22 to be discharged from the respective compartments through the opening 18 in the bin 15 into the trough 11 as will be clearly apparent.

Arranged below the bottom 19 and mounted in the ends 10 of the frame A of the feeder is a longitudinal shaft 23, which is centrally located relative to the opening 18 in the bin 15 and swingingly supported from this shaft 23 is a plurality of nose or head boards 24 which have fixed thereto strap hangers 25, preferably in pairs secured near opposite ends of each board 24 and loosely encircling the shaft 23 for the swinging of each board 24 from the shaft 23 in depending relation to vertically aline with the partition or slat 14 located in the trough 11. These boards 24 in their series are located under the respective compartments 22 and are held in spaced relation to each other for free swinging movement through the medium of spacer washers 26 mounted upon the shaft 23 and surrounding the same, so that the respective boards 24 will swing independently of each other when actuated by the animals when eating from either side of the trough 11, the sections or boards 24 being normally disposed in vertical alinement with the partition or slat 14 centrally of said trough as is clearly shown in Fig. 3 of the drawings.

Mounted on the under face of the false bottom 19 at the center thereof are spring hinges 27, which are also connected with normally closed valves or gates 28 for the openings or slots 20, there being a pair of openings or valves 28 for each compartment the gates or valves 28 for each compartment 22 and the same normally close the openings or slots 20 leading therefrom.

Connected to opposite sides of each nose or head board 24 medially thereof are substantially L-shaped brackets 29 while loosely connected to the pairs of gates 28 are stems or rods 30 which are loosely passed through the brackets 29 and have tapped or threaded thereon adjusting nuts 31 which are adapted to engage the free arms of the brackets 29 so that on the swinging of the head board 24 in one direction one of the gates or valves 28 will open to permit the discharge of feed from a compartment 22 to the trough 11 on the side of the partition 14 therein next to the animal actuating the head or nose board 24 for the delivery of feed of a quantity to said trough. When one of the gates or valves 28 of a compartment 22 is open the other gate or valve 28 thereto is closed, so that a quantity of food is delivered from a compartment 22 into the trough, and only on that side of the same where the animal is located, thus avoiding any possibility of the waste of the contents of the compartment 22, as only a sufficient quantity of feed will be admitted to the trough to be consumed by the animal and the admission of this feed is controlled or regulated by the action of the animal on displacing the nose or head board 24 which controls the operation of the valves or gates 28, it being impossible to operate both of the valves or gates 28 for the opening thereof simultaneously when the nose or head board is displaced to either side of the trough 11.

Secured to the ends 10 of the body frame A on opposite sides of the bin 15 are reversely inclined cover sections or boards 31' which serve as a roof to protect the trough 11 from rain, sleet or snow as will be clearly apparent.

Passed transversely through the vertical partition or slat 14 in the trough 11 at intervals thereof are cross tie rods 32 which are bolted or otherwise fastened to the side walls 13 of said trough and also are connected to upwardly convergent braces 33, which are also bolted or otherwise fastened to the sides of the bin 15 and in this manner the said trough is rigidly held in the body or frame A between the ends 10 thereof.

The tie rods 32 also serve to separate the trough 11 into a plurality of feeding spaces for the animals.

It is obvious that the trough 11 is accessible from either side of the feeder and that the food material in the respective compartments 22 in the bin 15 will be automatically fed therefrom into the feeding spaces within the trough 11 without any possibility of the waste of the feed, as a quantity of the feed is delivered to the trough at either side thereof according to the location of the animal to be fed, the animal controlling the nose or head board 24 which regulates the discharge of feed from the compartment 22 in the bin 15 into the trough.

There is no possibility of the feed within the compartment 22 in the bin 15 becoming wet due to moisture or water gaining entrance into the bin 15 when the feeder is in use during inclement weather, thereby avoiding the molding of the feed. Further it is impossible for the feed within the trough 11 when it is delivered thereto to become wet from rain as the cover or top section 31' shields the trough 11 therefrom.

From the foregoing it is thought that the construction and manner of operation of the feeder will be clearly understood and therefore a more extended explanation has been omitted.

Changes variations and modifications are contemplated in the invention, as fall properly within the scope of the appended claims, without departing from the spirit of the invention or sacrificing any of its advantages.

What is claimed is:

1. A feeder of the character described, comprising a frame adapted to be supported upon a foundation, a bin in the frame and having a lower open end, transverse partitions within the bin to divide the same into independent compartments, a false bottom within the bin elevated above its open lower end and forming discharge slots adjacent to opposite sides of said bin, a trough beneath the lower open end of the bin and having a central vertical wall, a nose board pivoted in the lower open end of the bin, disposed normally vertical and extended close to the vertical wall in the trough, and gates swingingly connected to the false bottom for closing the discharge slots and having connection with the nose board, so that when the latter swings in one direction one gate will remain closed and the other automatically opened.

2. A feeder of the character described, having a bin for containing feed and also provided with a trough below the said bin, a nose board swingingly supported between the trough and bin and operable from either side of said trough, means within the bin constructed and arranged to be actuated by the nose board so that feed within the bin will be delivered therefrom at one side of the board into the trough and prevented from discharge at the other side of said board, and partitions within the bin for dividing the same into independent compartments, the nose board being formed in a plurality of sections corresponding in number to the respective compartments in the bin and actuated independently of each other.

In testimony whereof we affix our signatures hereto.

ORA W. HINER.
DANA C. FARNHAM.
ELI A. FARNHAM, JR.